US009234461B2

(12) United States Patent
Snyder (10) Patent No.: US 9,234,461 B2
(45) Date of Patent: Jan. 12, 2016

(54) ENVIRONMENTAL DEFENSE SHIELD (71) Applicant: Shield Aerodynamics LLC, Pine Bluff, AR (US)

(72) Inventor: Dennis Snyder, Pine Bluff, AR (US)

(73) Assignee: Shield Aerodynamics LLC, Pine Bluff, AR (US)

( * ) Notice: Subject to any disclaimer, the term of this patent is extended or adjusted under 35 U.S.C. 154(b) by 0 days.

(21) Appl. No.: 14/663,604

(22) Filed: Mar. 20, 2015

(65) Prior Publication Data

US 2015/0345391 A1 Dec. 3, 2015

Related U.S. Application Data (63) Continuation of application No. PCT/US2013/062392, filed on Sep. 27, 2013.

(60) Provisional application No. 61/706,400, filed on Sep. 27, 2012.

(51) Int. Cl.
F02C 7/055 (2006.01)
F02C 7/05 (2006.01)
B64D 33/02 (2006.01)

(52) U.S. Cl.
CPC . F02C 7/055 (2013.01); F02C 7/05 (2013.01); B64D 33/02 (2013.01); B64D 2033/022 (2013.01)

(58) Field of Classification Search
CPC ........... F02C 7/05; F02C 7/055; B64D 33/02; B64D 2033/022

USPC ................... 60/779, 39.091, 39.092, 39.093; 244/53 B

See application file for complete search history.

(56) References Cited

U.S. PATENT DOCUMENTS

| 2,553,512 | A | * | 5/1951 | Cotton, Jr. | 55/306 |
|---|---|---|---|---|---|
| 3,121,545 | A | * | 2/1964 | Meletion | 244/53 B |
| 3,196,598 | A |  | 7/1965 | Olson |  |
| 3,426,981 | A | * | 2/1969 | Allcock | 244/1 R |
| 4,833,879 | A | * | 5/1989 | Verduyn et al. | 60/39.092 |
| 4,924,228 | A | * | 5/1990 | Novak et al. | 342/2 |
| 5,411,224 | A |  | 5/1995 | Dearman et al. |  |
| 7,678,997 | B2 |  | 3/2010 | Rawlings |  |
| 7,923,668 | B2 | * | 4/2011 | Layland et al. | 219/535 |
| 8,052,083 | B1 | * | 11/2011 | Moran | 244/53 B |
| 8,117,820 | B1 | * | 2/2012 | Briscoe | 60/39.092 |
| 2009/0016872 | A1 |  | 1/2009 | Anghileri |  |
| 2010/0146980 | A1 | * | 6/2010 | Strom et al. | 60/770 |

OTHER PUBLICATIONS

International Search Report and Written Opinion for PCT/US2013/062392 (dated Jun. 13, 2014).

* cited by examiner

Primary Examiner — Steven Sutherland (57) ABSTRACT

An environmental defense shield includes symmetric airfoil-shaped vanes contributing to and positioned around a plenum space and positioned in front of a turbine engine. An annular band stiffener is set into the vanes, which projects forward in a diminishing size, the vanes merging together to create or attaching to a solid nose. The environmental defense shield serves to protect the engine from debris while also smoothing airflow into the engine.

20 Claims, 11 Drawing Sheets

ENVIRONMENTAL DEFENSE SHIELD

CROSS-REFERENCE TO RELATED APPLICATIONS

This application is a continuation of international patent application no. PCT/US2013/062392, filed on Sep. 27, 2013, and entitled "Environmental Defense Shield," which in turn claims the benefit of provisional patent application No. 61/706,400, filed on Sep. 27, 2012, and entitled "Environmental Defense System." Such applications are incorporated herein by reference in their entirety.

BACKGROUND

The present invention relates generally to turbine engines and more specifically to protective devices for turbine engines that prevent debris from entering the engine, and to smooth turbulent air flow.

Turbine engines produce thrust by increasing the velocity of the air flowing through the engine. A turbine engine consists primarily of an air inlet, compressor, combustion chamber or chambers, turbine section, and exhaust. There are several different types of turbine engines, but all turbine engines have some parts in common. All turbine engines have an inlet to bring free stream air into the engine. The inlet sits upstream of the compressor and its design is an important factor in engine net thrust or power.

The total pressure through the inlet may be reduced because of several flow effects. Aerodynamicists characterize the inlet's pressure performance by the inlet total pressure recovery, which measures the amount of free stream flow conditions that are recovered. The pressure recovery depends on a wide variety of factors, including the shape of the inlet, the speed of the aircraft, the air flow demands of the engine, and aircraft maneuvers.

As air is brought from free stream to the compressor face, the flow may be distorted by the inlet. At the compressor face, one portion of the flow may have a higher velocity or higher pressure than another portion. The flow may be swirling, or some section of the boundary layer may be thicker than another section because of the inlet shape. The rotor blades of the compressor rotate around the central shaft. As the blades encounter distorted inlet flow, the flow conditions around the blade change very quickly. The changing flow conditions can cause flow separation in the compressor, a compressor stall, and can cause structural problems for the compressor blades.

Due to the design and function of a turbine engine's air inlet, the possibility of ingestion of debris always exists. This causes significant damage, particularly to the compressor. When this occurs, it is called foreign object damage (FOD). Typical FOD consists of small nicks and dents caused by ingestion of small objects from the ramp, taxiway, or runway. However, FOD damage caused by bird strikes or ice ingestion can also occur, and may result in total destruction of an engine. Prevention of FOD is a high priority in aircraft safety.

Typically, turbine engines have an air intake inlet opening also referred to as an inlet duct, the front portion of which comprises an air intake opening lip (or "lipskin") to, among other things, protect the leading edge of the air intake opening. The center of the engine, however, remains open and accessible to birds, wildlife and other foreign object debris damage, including even possible terrorist threats. In addition, a vortex pattern of turbulent air is caused, partially by air flow over the lipskin in several directions, which causes sand, gravel and small objects to be ingested into the engine and causes lower engine efficiency.

Engine protection devices have been proposed, which substantially comprise a shroud surrounding the engine component and fitted to a fixed supporting member of the engine component. Many propose a construction of metals, such as steel, which must be particularly thick and heavy. Such shrouds are therefore unsatisfactory, by increasing the overall weight of the aircraft and so impairing performance and increasing fuel consumption. In the case of inlet covers, such as screens, they have been found to produce a safety hazard when ice forms over the screen. They also can impair the efficiency of the engine by interfering with normal air flow through the engine. It has also been proposed to activate or retract such protection devices by mechanical or explosive actuators, reacting to sensors that have been installed in the craft's nose cone. This complexity renders such designs unpractical for most aircraft. A turbine engine protection device that avoids these disadvantages is thus highly desirable.

BRIEF SUMMARY

The present invention is directed to an environmental defense shield for a turbine engine, which serves to block debris and other foreign objects from entering the engine with minimal interference to the airflow into the engine. The present invention is designed to deflect solid mass energy, rather than to absorb it, eliminating additional stress on other structural members of the cowling and attachments, wing, or body members of the aircraft. This is accomplished by means of shape, construction and/or material composition. In one aspect, the present invention is directed to an environmental defense shield for a turbine engine on an aircraft, the environmental defense shield comprising a plurality of aerodynamic vanes, wherein each of the aerodynamic vanes comprises a leading edge and a trailing edge wherein the leading edge and trailing edge are not equidistant at all points along the length of each of the plurality of aerodynamic vanes, and further wherein each of the plurality of aerodynamic vanes comprises a symmetrical airfoil cross-sectional shape. The shield mitigates distortion of the air intake opening flow caused by boundary layer differences, crosswinds and/or swirling, such as reducing the disruption of vortices around the air intake opening by placement of a plurality of vanes, attached or merged with a base, and by conditioning the air with multiple vanes that keep the air directed, while maintaining, or stabilizing, velocity and air flow pressure and creating a more consistent air flow before the air reaches the engine intake. Such reductions in turbulence will result in improved engine efficiency and fuel savings. The present invention also has a noise suppression value, because reducing inflow distortion reduces the production of noise. In addition, the invention can absorb noise when using acoustic absorbing materials, reducing the noise that can be heard from outside the engine. The surface material of the invention in various embodiments may mitigate the formation of moisture that can lead to ice particles, so as to prevent ice from forming to an extent as to cause any engine ingestion problems. It also has a damping effect on existing vibration, such as lessening of ultrasonic frequencies usually generated by the leading edge of the inlet opening, which can also help in reducing noise and aircraft body fatigue and fractures. The present invention thus increases aircraft safety, reduces property damage, creates fuel cost savings, and lessens the environmental impact of air travel.

These and other objects, features, and advantages of the present invention will become better understood from a consideration of the following detailed description of the pre-

DETAILED DESCRIPTION

Referring now to the drawings wherein is depicted for purposes of illustrating preferred embodiments of the present invention only, and not for purposes of limiting the same, FIGS. 1-9 illustrate a defense shield which is constructed in accordance with the present invention.

Figure 1:
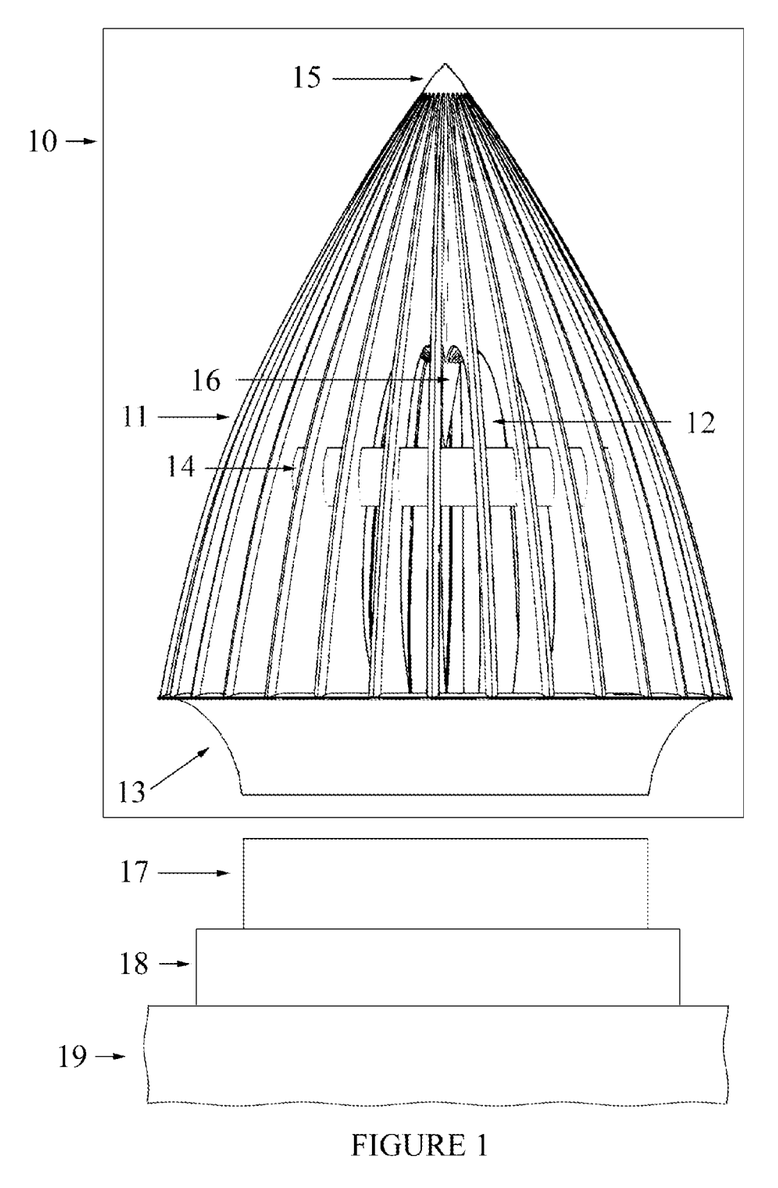
FIG. 1 is a side elevational view of a preferred embodiment of the present invention.
Figure 1B:
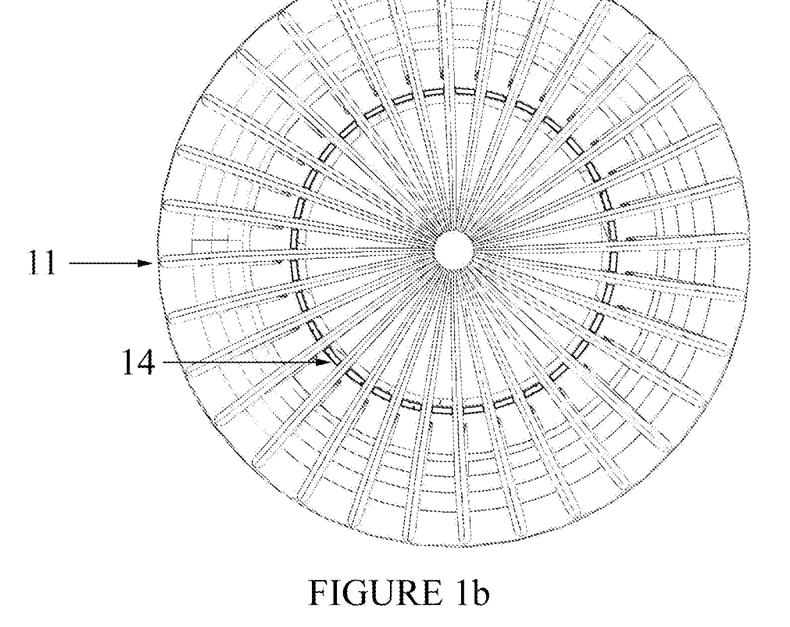
FIG. 1b is a top plan view of a preferred embodiment of the present invention.
Figure 1C:
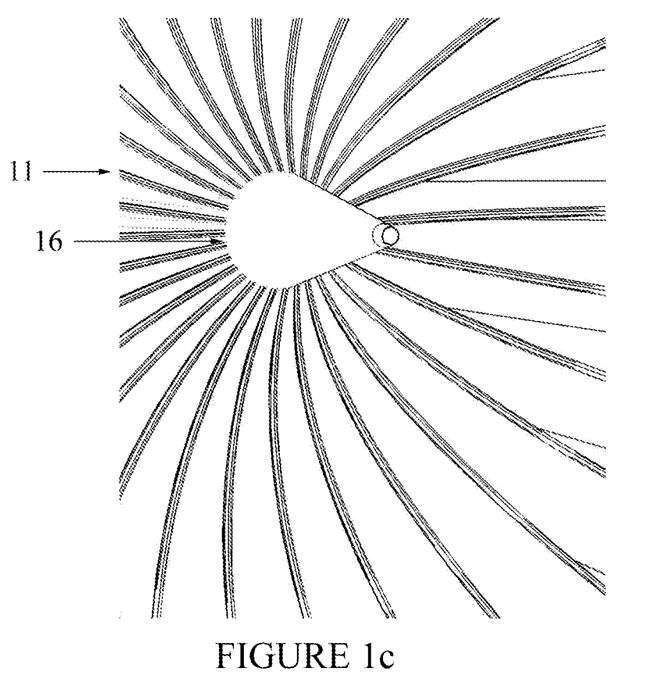
FIG. 1c is a perspective detail view of a reverse cone within the vanes of a preferred embodiment of the present invention.

Referring now to FIGS. 1, 1b, and 1c, one preferred embodiment of the present invention is described for the defense shield 10, which includes vanes 11, the plenum space 12, the base in a partial ring torus or "C" shape 13, the band stiffener 14, the nose 15, the reverse cone 16, the air intake opening 17, the engine 18 and the aircraft 19. The vanes 11 emanate from the tangent point of the side of the base 13, where it connects to or merges with the base 13, to reduce the trapping of any flow of air that can cause drag or turbulence. The vanes 11 will project forward in a symmetrical airfoil shape. The band stiffener 14 is a ring having an airfoil shape that is set into the vanes 11 which projects forward in a diminishing size, and diametric circumference merging together to create or attaching to a solid nose 15. In another embodiment of the present invention, not shown, the band stiffener 14 is not used. In another embodiment of the present invention, not shown, multiple band stiffeners 14 are used.

Shield 10 can be attached mechanically or non-mechanically or a combination thereof, to an existing lipskin and/or other part of aircraft 19 that offers access to air intake opening 17, and/or it can include an improved lipskin that can be used as a replacement unit for an existing lipskin, or where no lipskin is installed. The improved lipskin can be attached as a part of or integrally formed with the air intake opening 17. Additionally, the preferred embodiment can be attached mechanically or non-mechanically or a combination thereof, to a base 13 that is attached mechanically or non-mechanically or a combination thereof, to air intake opening 17 and/or other parts of aircraft 19, permitting the preferred embodiment to be moved or removed for closer inspection of engine 18. Shield 10 may be mounted partially or wholly within air intake opening 17.

Vanes 11 are each constructed, as noted above, in a symmetrical airfoil shape. For purposes herein, the term "vane" refers to an object analogous to the vane of a bird's feather, and does not refer to a spinning device such as a weather vane or turbine. Vanes 11 are shaped as an "airfoil," that is, they produce a desired reaction force when in motion relative to the surrounding air. In this case, vanes 11 are used to direct the air in a manner to minimize turbulence and pressure loss. Vanes 11 are also of a symmetrical shape, thus having a curvature and shape such that one side of each vane 11 is formed in the mirror image of the opposite side of such vane 11; vanes 11 are thus different from airfoils, such as many aircraft wings, that use an asymmetrical shape.

The quantity and size of the vanes 11 is dependent on the diameter of the air intake opening 17 or position where shield 10 is mounted, such as when mounted partially or wholly within air intake opening 17. The shape of a plurality of the vanes 11 are arranged to create an internal plenum space 12, upstream of engine 18, with a region for the air flow to adjust to small pressure drop differences, thus providing a uniform pressure at engine 18 to mitigate stability or stall problems. The leading edge or face of the band stiffener 14 may be perpendicular to the face of the base 13, paralleling the longitudinal center line of the system and acts to direct air flow to areas of the air intake opening 17. The base 13 has a wall diameter and thickness that is determined by the diameter of air intake opening 17 or the position where shield 10 is mounted. The reverse cone 16 allows air flow, entering at the nose 15, to travel down its length to help maintain direction and pressure. In another embodiment of the present invention, not shown, the reverse cone 16 is not used.

Figure 5:
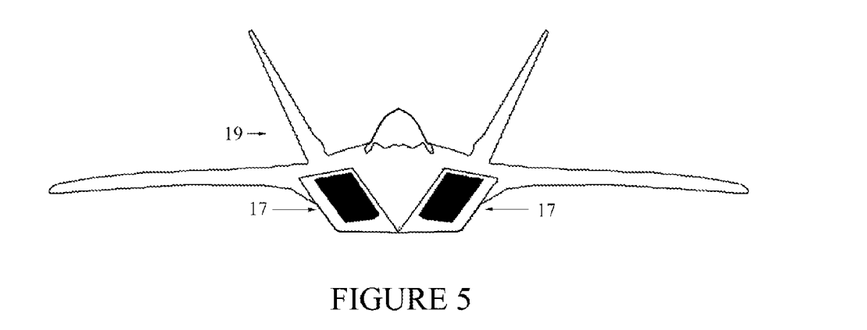
FIG. 5 is a front elevational view of an aircraft suited for fitting of a preferred embodiment of the present invention.

Air intake opening 17 may be of any number, size, shape, and configuration, including intermediate airflow passageways, which connect with any number of aircraft engines 18, in various embodiments of the present invention. One example is shown in FIG. 5, where two air intake openings 17 lead to a common engine 18 (not shown within aircraft 19). Environmental defense shield 10 interfaces with and/or attaches to or is integrally formed with any portion of aircraft 19 such that it provides access to engine 18. The particular method of attachment of environmental defense shield 10 is chosen from those well known to one of skill in the art.

Figure 2:
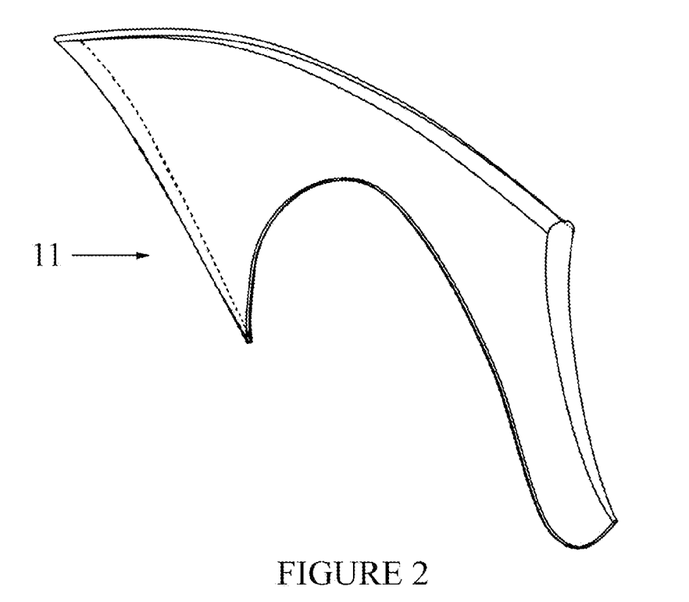
FIG. 2 is a perspective view of a single vane according to a preferred embodiment of the present invention.

Referring now to FIG. 2, the preferred embodiment of the current invention is described comprising a plurality of longitudinal aerodynamic vanes, being in the shape of a symmetrical airfoil defined as having equal curvature of upper and lower surface as previously described, with vane 11 having the possibility of a variable shape, length and width. FIG. 2 is a perspective view of vane 11, illustrating that each end maintains the shape of a symmetrical airfoil defined as having equal curvature of upper and lower surface.

Figure 3:
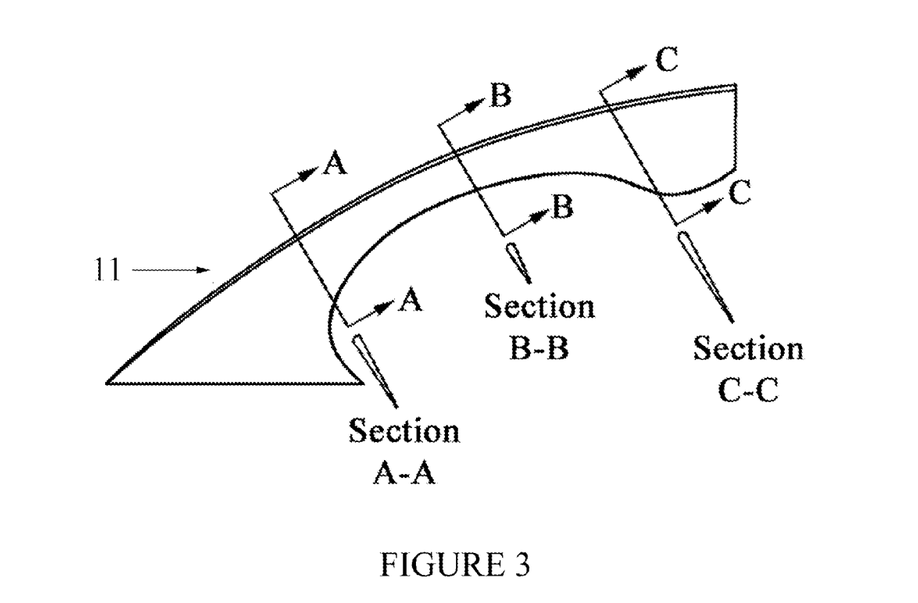
FIG. 3 is a side elevational view of a single vane according to a preferred embodiment of the present invention.

Referring now to FIG. 3, vane 11 is illustrated where A-A, B-B and C-C show three areas that are sliced for inspection. Perpendicular Section A-A, Section B-B, and Section C-C illustrate that at varying widths and lengths, each section remains in the shape of a symmetrical airfoil defined as having equal curvature of upper and lower surface.

Figure 4:
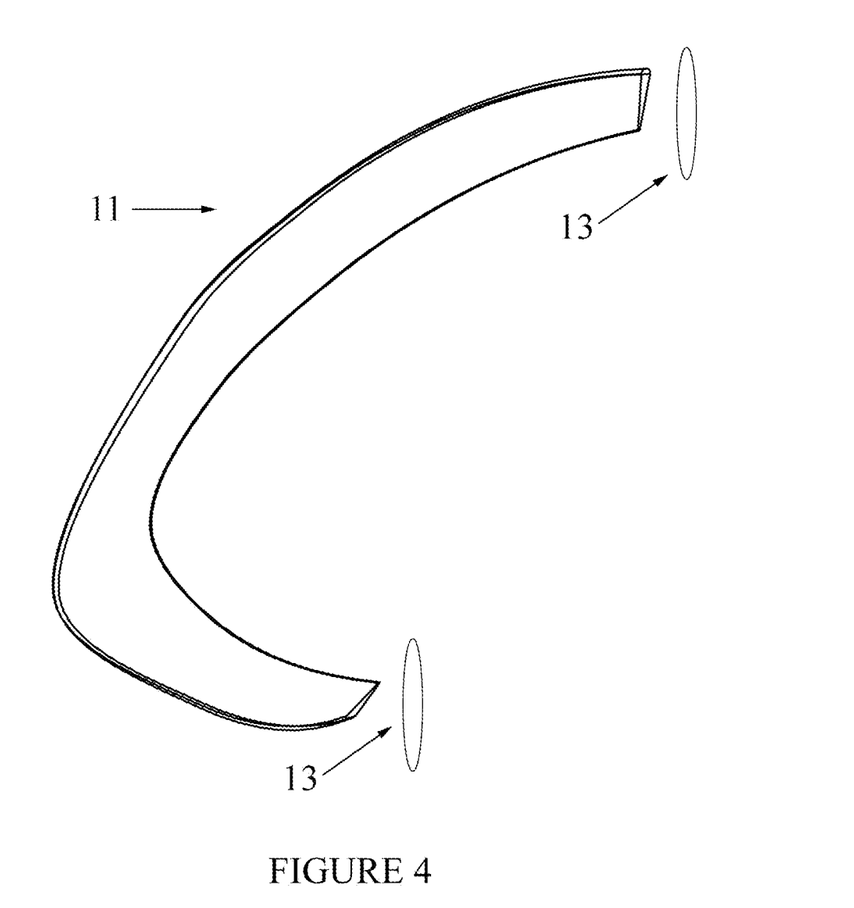
FIG. 4 is a perspective view of a single vane according to an alternative embodiment of the present invention.

Referring now to FIG. 4, vane 11 in another embodiment of the present invention may be one piece, extending from one position on the base 13, to another position on the base 13, while maintaining the shape of a symmetrical airfoil defined as having equal curvature of upper and lower surface.

Figure 6:
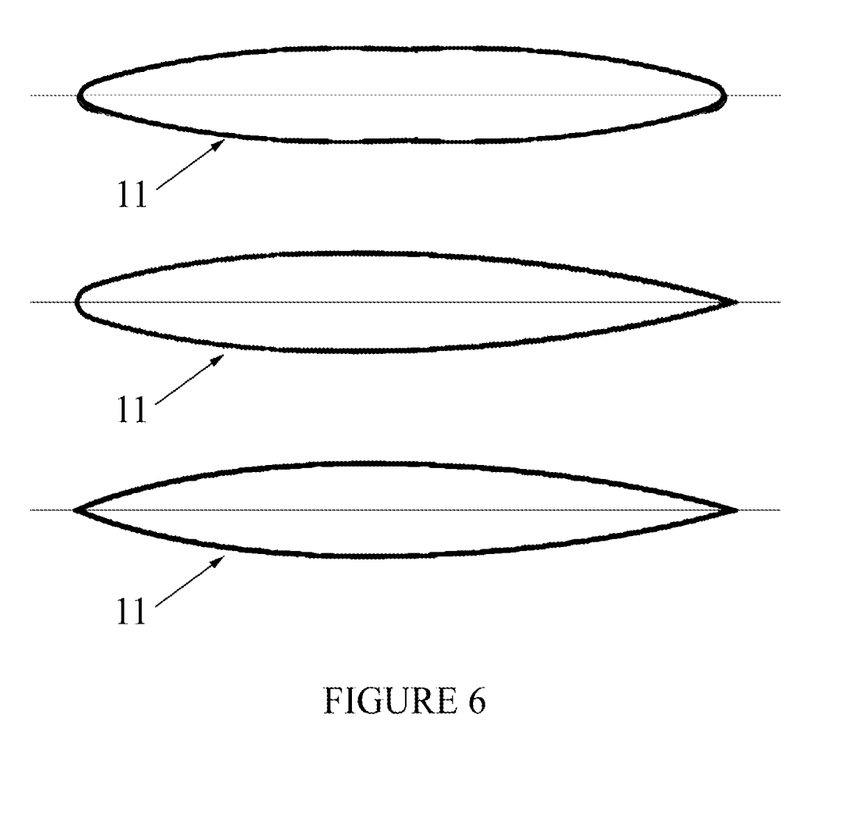
FIG. 6 is a cross-sectional view of three different exemplary vane geometries among many possible variations in a preferred embodiment of the present invention.

Referring now to FIG. 6, three vanes 11, represent three of many possible shapes, each being in the shape of a symmetrical airfoil defined as having equal curvature of upper and lower surface, as illustrated by a horizontal center line. The preferred embodiment is shown in the middle of FIG. 6, where the leading edge is curved while the trailing edge has a sharper or thinner edge.

Figure 7:
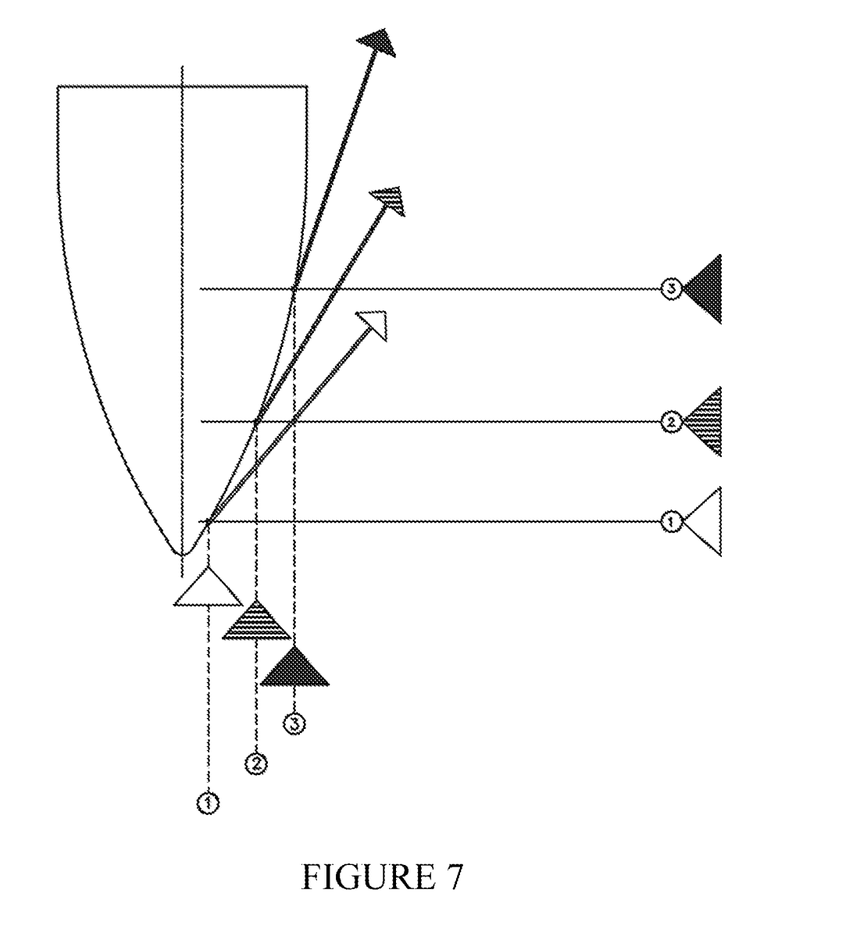
FIG. 7 is a side elevational view illustrating different geometries of objects striking a preferred embodiment of the present invention.

Referring now to FIG. 7, a calculation of deflected trajectories of three objects striking the system at three different positions is illustrated, showing the different trajectories of objects striking the face of environmental defense shield 10, and the approximate resulting trajectories of those objects being deflected. At point 1 on the graph, the object strikes toward the nose creating a wide area of deflection. As the object strikes farther back along the side, at points 2 and 3, the field of deflection narrows to a lesser area angle of deflection, thus decreasing the deflected energy that is created.

Figure 8:
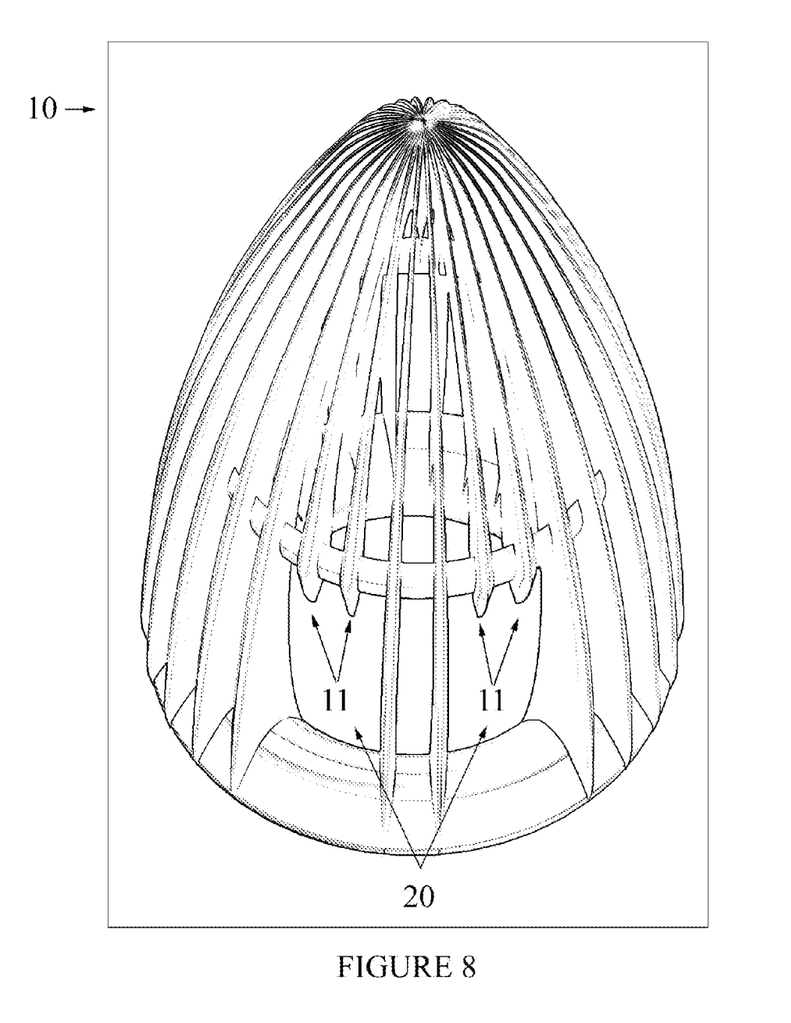
FIG. 8 is a perspective view of an alternative embodiment of the present invention.

Now referring to FIG. 8, another embodiment of the present invention is an environmental defense shield 10, comprising vanes 11 at least one of which does not begin at base 13, but rather begins or is attached at the end by connecting with or merging with the band stiffener 14, providing an additional air space for increased air flow.

Figure 9A:
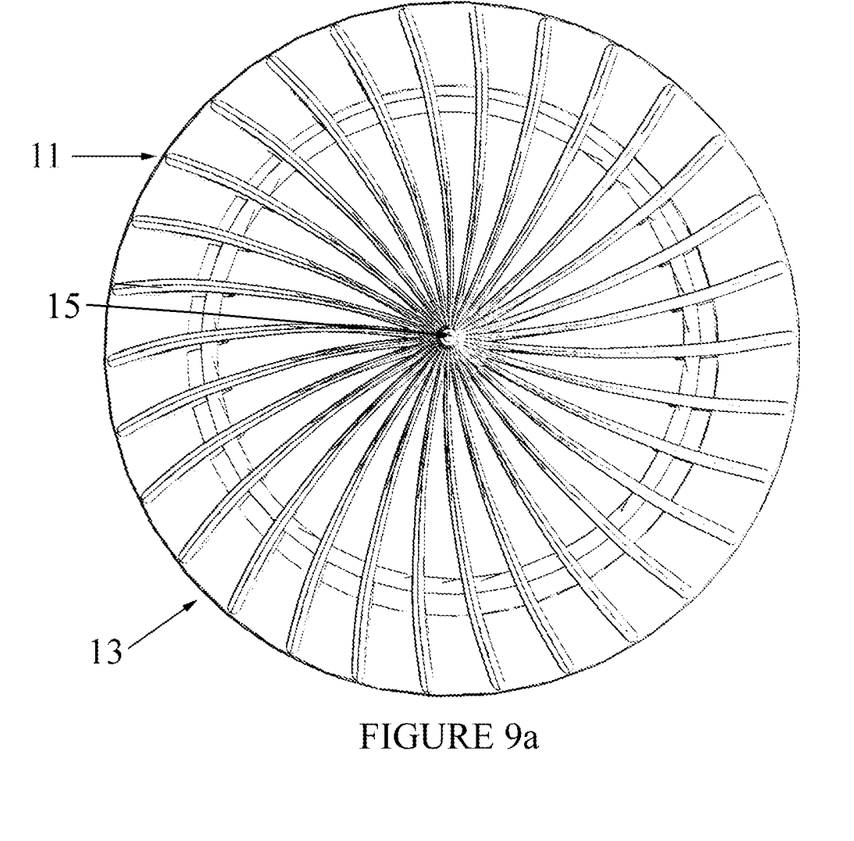
FIG. 9a is a top plan view of an alternative embodiment of the present invention with a twisted vane arrangement.
Figure 9B:
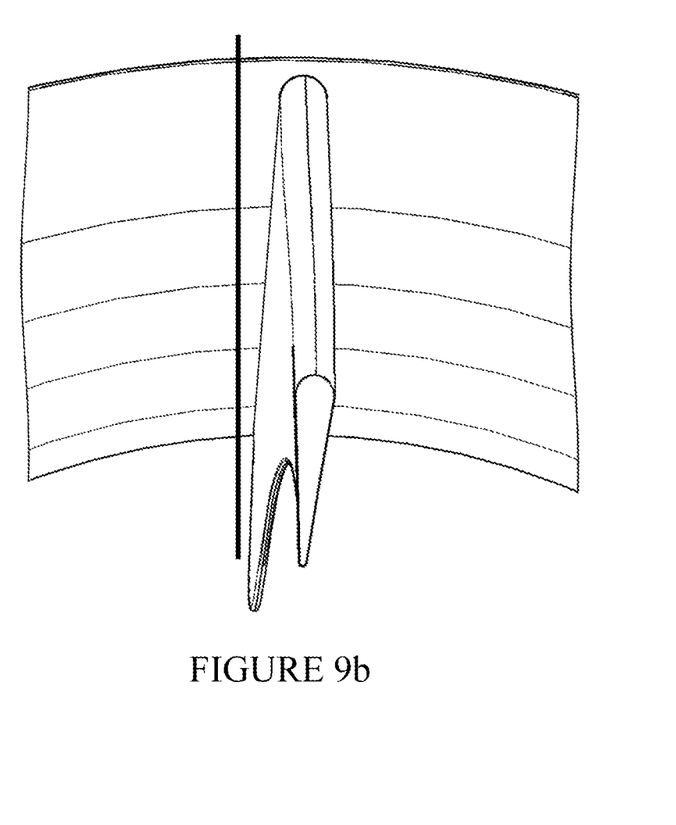
FIG. 9b is a perspective view of a rotated vane according to an alternative embodiment of the present invention.

In various alternative embodiments, vanes 11 may be twisted into a rifling-like shape, rather than being straight as depicted in FIG. 1, and/or each rotated around the long axis of each of the vanes, in order to provide a rotation to air as it enters engine 18. One such embodiment is shown in FIG. 9a. In the embodiment of FIG. 9a, it may be seen that vanes 11 take on a slight counter-clockwise (or, in other alternative embodiments, clockwise) twisting, rifling-like shape, and thus together vanes 11 create a rotational air flow pattern as air is drawn into engine 18. In FIG. 9b, one vane is shown that is rotated around the central longitudinal axis of the vane in order to create rotation to air as it enters engine 18.

In the preferred embodiment and various alternative embodiments, shield 10 and its various components can be constructed of differing high strength-to-weight metals, metal alloys and/or powders, composites and/or polymer materials, such as, but not limited to, nanotube-polymers, nano-particle reinforced polymers, carbon and/or glass reinforced polymers and plastics, nanotube reinforced bulk metallic glasses and foams, cross-linked composite and cross-linked polymer products, thermoplastics and thermosets such as but not limited to, polyethylene, polythene, polycarbonate, polyethersulphone, polyetheretherketone (PEEK), polyvinylchloride (PVC), epoxy resin, amines, nylon, polytetrafluoroethylene (PTFE), polyamides, polyimides, phenolic, silicone, cyanoacrylates, anaerobics, acrylics, ceramics such as but not limited to, silicon nitride, silicon carbide, glass-ceramics, polyphenylene sulfide (PPS), aluminum and aluminum alloys such as but not limited to, Al—Cu, Al—Mg, AL—Mg—Si, Al—Zn—Mg, Al—Li, Al-8Zn-2.05Mg-2.3Cu-0.16Zr, magnesium alloys, titanium and titanium alloys and nickel, glass, aramid, carbon, carbon nanotubes, carbon nanofibers, carbon fibers, alumina, silicon carbide, Kevlar, aromatic polyamide, hexafluoropropylene, graphite, bismaleimide, bismaleimide foams, bismaleimide poly carbons, s-glass, gel-coat, carbon-based fibers, tetrafluoroethylene, polystyrene, polyethylene, polyethylene napthalate, polyvinylidene fluoride, metalized and unmetalized PPS, maleimide ceramics, liquid crystal resins, bulk metallic glasses and foams, molybdenum, graphene, fullerenes, epoxies and resins curable by various sources, such as but not limited to lasers, powders having the capability of being bonded, and/or sintered by various sources, such as but not limited to lasers and/or electron beams, or any combination thereof.

In various alternative embodiments, additional anti-icing features may be incorporated into one or more components of shield 10. In various embodiments, the anti-icing features of one or more of the components of shield 10 may include the use of compressor bleed air for pneumatic heating and or mechanical expansion; electronic heating elements attached to or embedded within such components; the use of low coefficient of friction materials for such components; and/or other methods such as but not limited to the use of nano particles and/or ice-phobic coatings and/or additives on such components. Materials include, but are not necessarily limited to, ice-phobic materials, slippery liquid infused porous surface (SLIPS) materials.

In various alternative embodiments, one or more of the components of shield 10 may have anti-static or other coatings or material constituents intended to mitigate or reduce the likelihood of lightning strikes. Such materials or components may include, but are not limited to, metal mesh, Spraylet antennae guard, and polymeric ultra-conductive films and coatings.

In various alternative embodiments, one or more of the components of shield 10 may receive coatings or include materials to reduce an acoustic signature of shield 10, intake opening 17, and/or engine 18. Such materials may include, but are not necessarily limited to, nanotube-reinforced bulk metallic glasses.

In various alternative embodiments, one or more of the components of shield 10 may receive coatings or include materials to reduce a radar signature, infrared signature, and/or microwave signature of shield 10, intake opening 17, and/or engine 18. Such materials include but are not limited to Dyflon and Polypyrrole.

In various alternative embodiments, one or more of the components of shield 10 may receive coatings or include materials to provide elevated thermal or strength properties, including, but not limited to, carbon nanotubes, molybdenum, and/or graphene.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein. All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included in the disclosure. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. An environmental defense shield for a turbine engine on an aircraft, the environmental defense shield comprising a plurality of aerodynamic vanes, wherein each of the aerodynamic vanes comprises a leading edge and a trailing edge wherein the leading edge and trailing edge are not equidistant at all points along the length of each of the plurality of aerodynamic vanes, and further wherein each of the plurality of aerodynamic vanes comprises:
  a. a forward end;
  b. a rearward end;
  c. a first section at the forward end wherein the trailing edge at the first section comprises an arcuate, concave shape wherein a perpendicular distance between the leading edge and the trailing edge of each of the plurality of aerodynamic vanes at the forward end is larger than at any other position on the first section;
  d. a second section between the forward end and the rearward end, wherein a perpendicular distance between the leading edge and the trailing edge at the first section is larger than a perpendicular distance between the leading edge and the trailing edge at the second section; and
  e. a third section at the rearward end wherein the trailing edge at the third section comprises an arcuate, convex shape wherein a perpendicular distance between the leading edge and the trailing edge at the rearward end is larger than a perpendicular distance at at least one other position on the third section.

2. The environmental defense shield of claim 1, wherein the plurality of aerodynamic vanes are arranged longitudinally in a radially extending pattern around a central longitudinal axis of the shield.

3. The environmental defense shield of claim 1, wherein the plurality of aerodynamic vanes are spaced apart to allow air to enter the engine while mitigating the ingestion of objects into the engine.

4. The environmental defense shield of claim 3, wherein the plurality of aerodynamic vanes are attached to or integrally formed with a base.

5. The environmental defense shield of claim 3, wherein the arrangement of the plurality of aerodynamic vanes defines an internal plenum space upstream of the engine.

6. The environmental defense shield of claim 5, wherein the leading edge of each aerodynamic vane of the plurality of aerodynamic vanes is longitudinally convex.

7. The environmental defense shield of claim 5, further comprising a reverse cone formed within the internal plenum space.

8. The environmental defense shield of claim 3, further comprising a nose cone at which the plurality of aerodynamic vanes connect forward of the engine.

9. The environmental defense shield of claim 3, further comprising a band stiffener attached to at least two of the plurality of aerodynamic vanes and positioned forward of the engine.

10. The environmental defense shield of claim 9, wherein at least one of but fewer than all of the aerodynamic vanes of the plurality of aerodynamic vanes extends rearwardly to the band stiffener but does not extend rearwardly a full length of the shield, thereby defining an open space on the shield.

11. The environmental defense shield of claim 3, wherein each of the plurality of aerodynamic vanes are twisted around a central longitudinal axis of the shield whereby airflow is caused to rotate upstream of the engine.

12. The environmental defense shield of claim 3, wherein each of the plurality of aerodynamic vanes are rotated around a central longitudinal axis of the aerodynamic vane whereby airflow is caused to rotate upstream of the engine.

13. The environmental defense shield of claim 3, further comprising at least one of a compressor bleed air inlet for pneumatic heating or mechanical expansion, an electronic heating element, or an anti-icing material or coating.

14. The environmental defense shield of claim 3, further comprising an anti-lightning coating or material.

15. The environmental defense shield of claim 3, further comprising an acoustic-absorbing material or coating.

16. The environmental defense shield of claim 3, further comprising a radar-absorbing material or coating.

17. The environmental defense shield of claim 3, further comprising a microwave-absorbing material or coating.

18. The environmental defense shield of claim 1, wherein each of the plurality of aerodynamic vanes comprises a symmetrical airfoil cross-sectional shape.

19. The environmental defense shield of claim 1, wherein each of the plurality of aerodynamic vanes comprises an asymmetrical airfoil cross-sectional shape.

20. An environmental defense shield for a turbine engine on an aircraft, the environmental defense shield comprising:
  a. a plurality of aerodynamic vanes; and
  b. a band stiffener attached to at least two of the plurality of aerodynamic vanes and positioned forward of the engine, wherein at least one of but fewer than all of the aerodynamic vanes of the plurality of aerodynamic vanes extends rearwardly to the band stiffener but does not extend rearwardly a full length of the shield, thereby defining an open space on the shield.

* * * * *